July 14, 1970 H. F. WUENSCHER 3,520,496
SERPENTUATOR
Filed Feb. 1, 1968 6 Sheets-Sheet 4
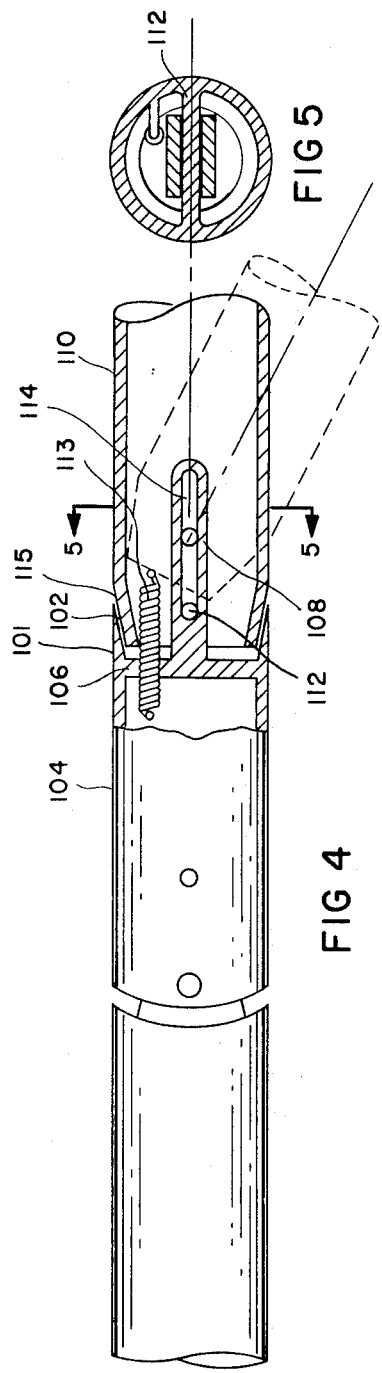
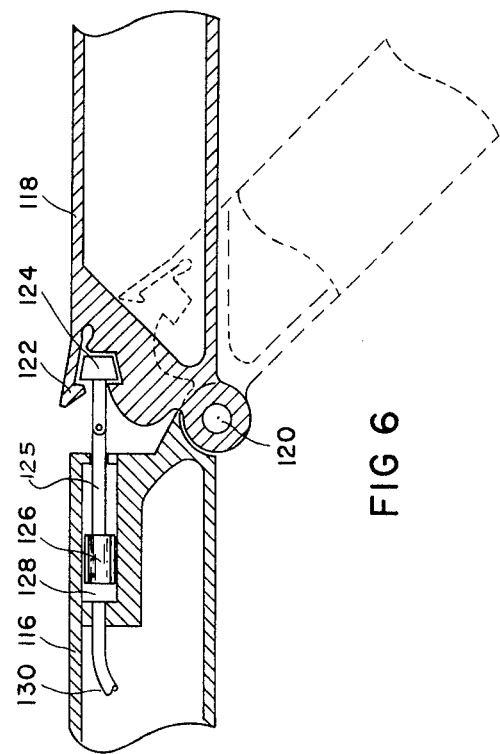
INVENTOR.(S)
HANS F. WUENSCHER
BY
ATTORNEYS July 14, 1970 H. F. WUENSCHER 3,520,496
SERPENTUATOR
Filed Feb. 1, 1968 6 Sheets-Sheet 5
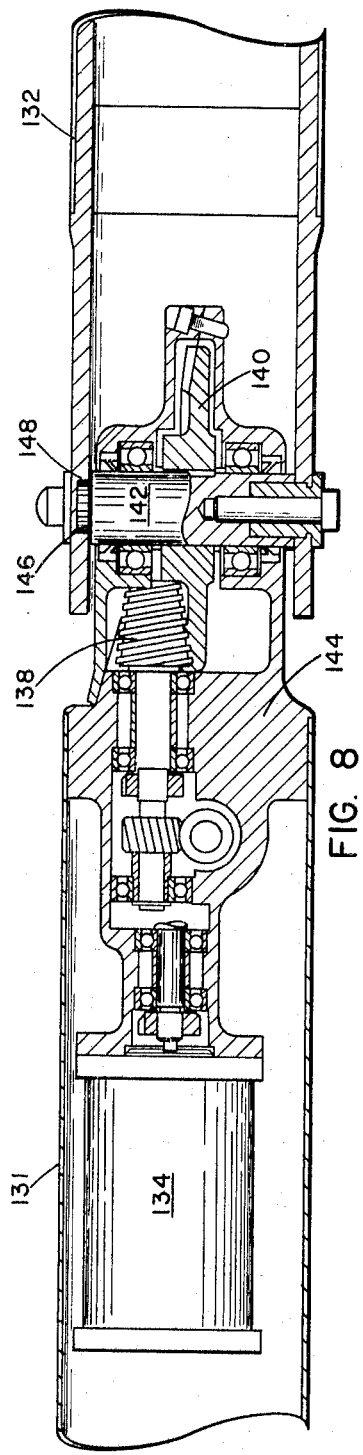
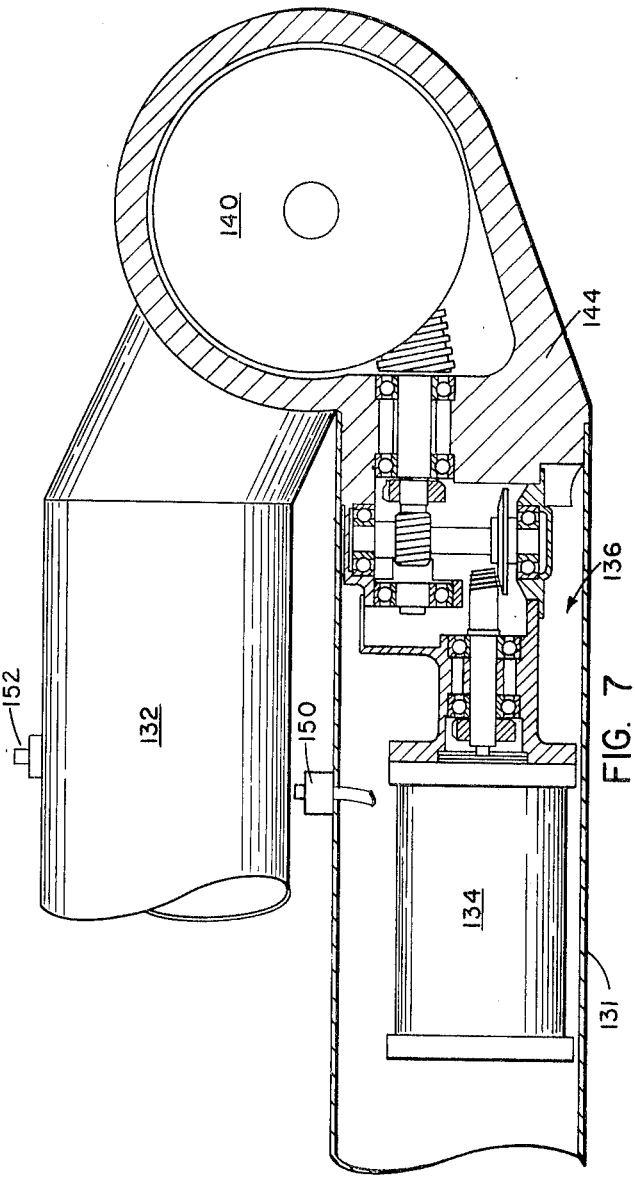
INVENTOR.(S)
HANS F. WUENSCHER
BY
ATTORNEYS

United States Patent Office 3,520,496
Patented July 14, 1970

3,520,496
SERPENTUATOR
Hans F. Wuenscher, Huntsville, Ala., assignor to the United States of America as represented by the Administrator of the National Aeronautics and Space Administration
Filed Feb. 1, 1968, Ser. No. 702,396
Int. Cl. B64g 1/00
U.S. Cl. 244—1                                    9 Claims

ABSTRACT OF THE DISCLOSURE

A "Serpentuator" is a system for an orbital space station that includes internal and external serpentine devices for performing physical operations such as positioning personnel and tools around the space station. Each device consists of a plurality of cylindrical links pivotally connected at their ends and includes servo-actuators connected between adjacent links for controlling the angular relationships of the links relative to one another. The external device has one end mounted to the space station and the internal device has a clamping means on one end for attachment to various parts of the space station or to the unattached end of the external device.

BACKGROUND OF THE INVENTION

The invention described herein was made by an employee of the United States Government and may be manufactured and used by or for the Government for governmental purposes without the payment of any royalties thereon or therefor.

This invention relates to a system for handling and locating both men and material in a zero gravity environment. More particularly, the invention is a system that includes articulated devices having elongated sections or links whose angular relationship is servo-controlled to provide what could be termed a serpentine actuator or "Serpentuator" for use in the vicinity of an orbital space station.

The successful operation of a space station or laboratory, or even a space manufacturing plant, in orbit about the earth or in any other zero gravity environment, will depend to a large extent upon the successful maintenance, repair, and possibly manufacturing operations, carried on at that facility. While success will depend upon many things one very important item will be the handling and locating of men and material and equipment inside and outside the main facility which would normally consist of manned quarters and command station.

It should be pointed out here that the equipment, machinery, tools, instrument arrangements or units, and other items used in a space facility will not necessarily be housed in the main facility. In space, protection against wind and rain is not necessary and, due to the weightless conditions that exist in space, a floor for the support of equipment and machinery is likewise not needed. In a terrestrial plant or laboratory machinery is retained in a particular position due to gravity and frictional forces resulting therefrom. For these same reasons a person or vehicle can easily travel to the machinery with tools and materials. This of course is not true in zero gravity environment, but just hanging free in space is not feasible because an infinite number of tumbling modes exist in this neutral stability situation. Thus, while a floor itself is not needed in a space laboratory, a locating and handling device is needed to perform the function of a terrestrial floor in positioning equipment and permitting ready access to such equipment for repair and use.

Positioning of men, materials and equipment in space presently depends primarily on reaction systems, such as an astronaut manuvering unit strapped to the astronaut or a reaction type unit held in the hand of the astronaut and used in conjunction with a tether attached between the space station and the astronaut. Mobility devices which use reaction motors to provide mobility to either a man or to an object are not satisfactory in that they expend mass by loss of expanded gases and the substances from which these gases are generated will have to be replaced during any extended operation of a space station. In addition, space operations formed by free flying astronauts and objects, are complicated by the orbital mechanics involved and also the fact that an astronaut on his own is very limited in any craftman type performance. Various cable and telescoping rod systems have been proposed, but rejected in that such systems did not provide the required mobility. Further, it has been found that umbilical connections between the spacecraft and astronaut greatly hinder the astronaut's mobility.

Space projects, both present and contemplated, include the development of large manned orbital space stations, launch platforms, scientific and research laboratories, space repair stations, space manufacturing facilities and others. The development of these and their placement in orbit may be accomplished by one of two different approaches; single launch using extremely large boosters, or by launching a number of separate modules. This latter approach requires a rendevous and mating of these modules and the actual construction of the space facility from the separate pieces. Other tasks, once the facility is completed, include maintenance, logistic supply, personnel transfer, manufacturing operations and retrieval of objects.

These activities, whether it be the assembly of a space station or the performance of a particular task within the station, are all tasks that must be performed and the efficiency and cost thereof will depend upon the processes and tools employed. How many tasks, and how much man can participate in these tasks depend upon how well the facility and equipment can be designed to accommodate the space environment.

SUMMARY IN THE INVENTION

As pointed out above, one of the major problems in space activities is that of mobility, positioning and restraint. The various mobility concepts which have been investigated heretofore have been designed primarily with the problem of locomotion or positioning of an astronaut in mind and have not considered these concepts from the standpoint of positioning tools and equipment necessary to carry out the fabrication and operation of, for example, a space laboratory. When considered in this light the present invention is a promising approach to space tooling. The invention is a train or chain of articulated cylindrical links which are moved by actuators mounted in each link. The entire chain, or Serpentuator as it is termed herein, can be controlled to unwind, extend, and possibly connect to a second body in space. It is contemplated that one Serpentuator will be mounted on the external surface of a space station and have one end free for movement throughout the vicinity of the space station. A second Serpentuator is adapted to be deployed within the interior of the space station for performing various operations therein. The second or internal Serpentuator has a clamping means attached to one end thereof for attaching the device to various parts of the space station or if desired the internal Serpentuator can be clamped to the free end of the external Serpentuator so as to increase the effective operating range thereof. Various types of implements for carrying out numerous activities in the vicinity of the space station can be mounted on the free end of the two Serpentuators.

BRIEF DESCRIPTION OF THE DRAWINGS

FIG. 4 is a sectional view of an alternative joint for links of the external Serpentuator;

FIG. 5 is a view along lines 5—5 of FIG. 4;

FIG. 6 is a view in section of an alternate powered hinge joint for the external Serpentuator;

FIGS. 7 and 8 are cross-sectional views of the powered hinge connection between adjacent links of the internal Serpentuator;

DETAILED DESCRIPTION OF THE INVENTION

Figure 1:
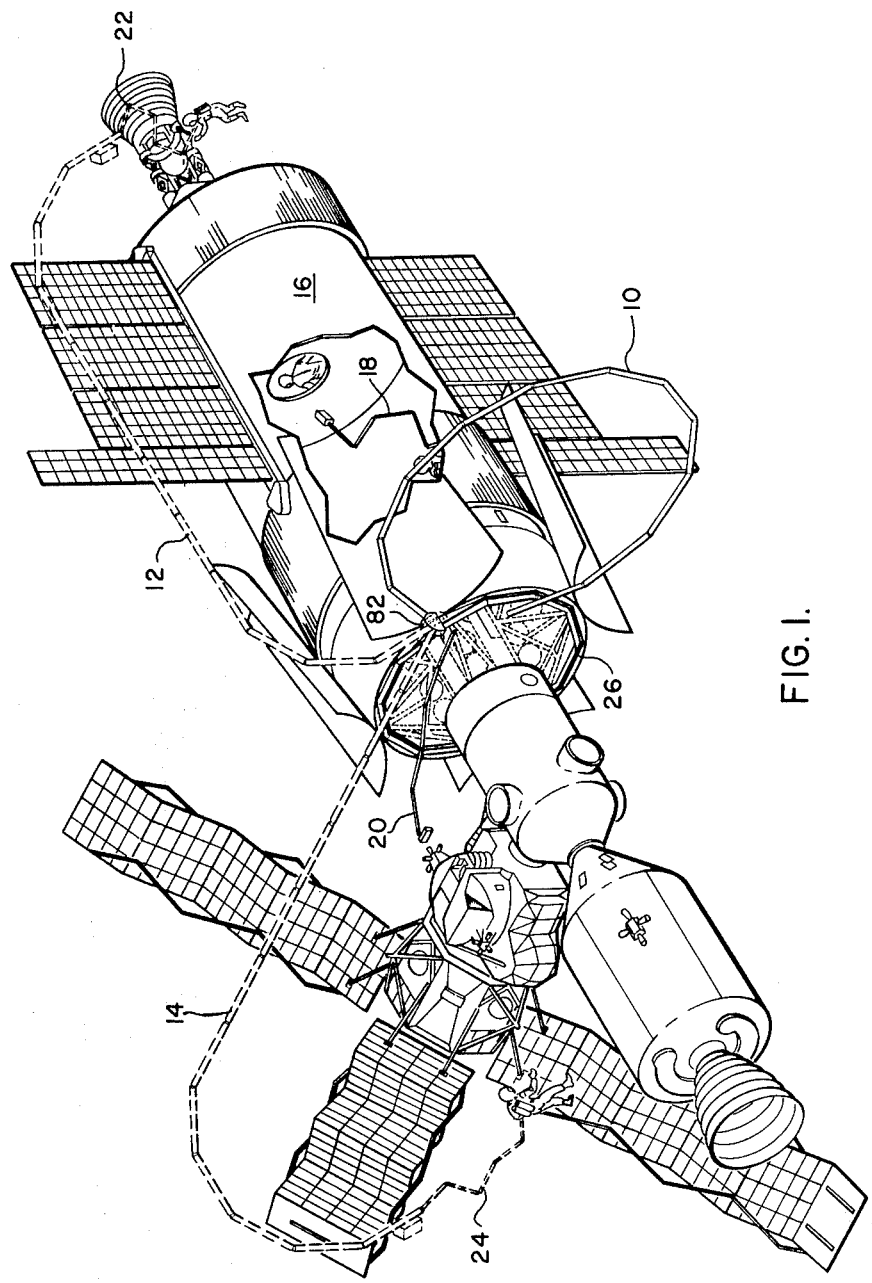
FIG. 1 is a pictorial view of a space station with deployed Serpentuators.

Referring now to FIG. 1 of the drawing which is a pictorial view of a contemplated space station illustrating an extra-vehicular or external Serpentuator device deployed in various positions. The Serpentuator depicted in solid lines and indicated by the numeral 10 is in a rest or standby position whereas the devices shown in dotted lines and indicated by the numerals 12 and 14 illustrate how the device can be deployed for use about space station 16. An intra-vehicular or internal Serpentuator device 18 is shown deployed within the interior of the space vehicle. While the internal Serpentuator is normally used in the interior of the space station, it can also be employed externally of the space station as illustrated by the device designated as 20 which has been clamped to external structure of the space station. Also, the internal Serpentuator device can be deployed on the free end of the external Serpentuator in a position such as that indicated by the numerals 22 and 24. External use of the internal Serpentuator is particularly useful when access to cramped areas is needed or to increase the effective operating range of the external Serpentuator.

It is contemplated that the standby position or rest position of the external Serpentuator will be the circular position occupied by the device designated with numeral 10. When placing or packaging the Serpentuator for launch into orbit where it will be used, it is desirable to arrange the device in a circle about the structure of the space station in an arrangement such as that designated by numeral 26. Such a storage configuration is desirable in that it is the most compatible configuration for existing launch vehicles. It can be seen that the relationship between the overall length of the device and its minimum storage circle or spiral depends upon three variables, namely, the number of powered hinged connections 28 (see FIG. 2) between the links, the maximum angle through which each link can move relative to an adjacent link and the length of each link. For example, if the maximum hinge angle would be 20 degrees in one plane, then 18 links would be necessary in order to roll the Serpentuator into a full circle. If each link were three feet long, then the device would be 54 feet long and the smallest circle which could be achieved would be 54 divided by $\pi$, or a circle with a 17.2 foot diameter.

In order to overcome the dependency om minimum storage circle diameter on the angular capacity of the powered hinges and the number of links, each of the links can be provided with an auxiliary midpoint hinge joint (see FIG. 4) at the midpoint of each link. These auxiliary hinge joints are normally used only during storage of the device for launch into orbit. At first deployment the auxiliary hinges will be opened and locked in a straight position and stay rigid during operations of the device.

Figure 2:
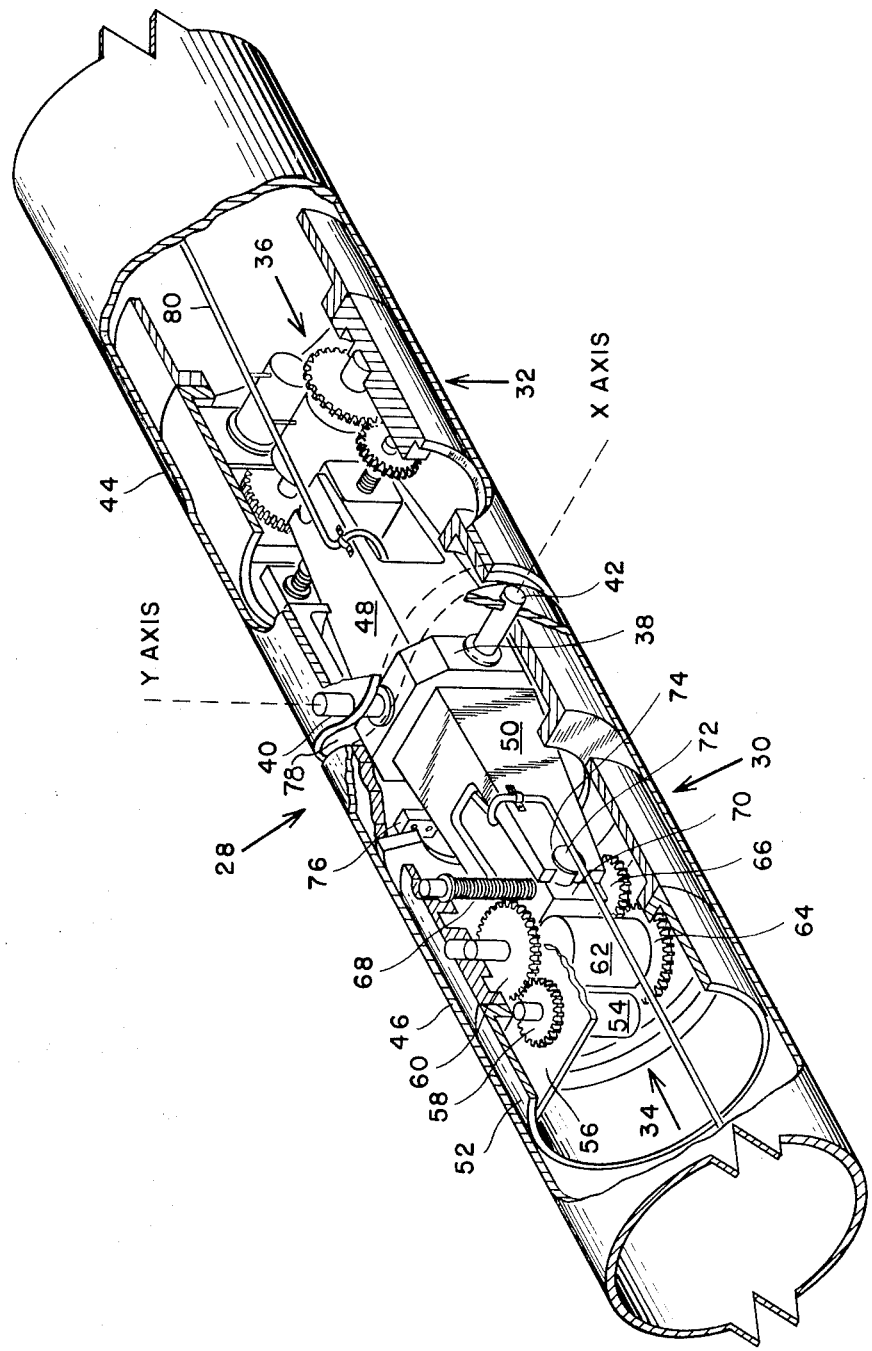
FIG. 2 is a pictorial view, partially in section, of a typical hinge connection between links of the external Serpentuator.

Referring to FIG. 2 wherein the joint or connection 28 between links 30 and 32 of the external Serpentuator is shown. The connection permits pivotal movement of link 30 about axis X and link 32 about axis Y. While only one joint connection will be discussed completely, it should be understood that the connection between each of the links in the external Serpentuator includes such a powered hinge connection. Drive mechanism 34 mounted in link 30, and causing movement about axis X, is identical to drive mechanism 36 causing movement about axis Y, except the components thereof have been rotated at an angle of 90 degrees relative to each other.

The connection consists of a trunnion block 38 having four trunnions, only two of which, 40 and 42, are shown, extending therefrom in diametrically opposed pairs. Trunnion 40 and the unshown opposite trunnion making up the pair is journaled in outer casing 44 of link 32. The other trunnion pair, trunnion 42 and its opposed counterpart (not shown) is journaled in outer casing 46 of link 30. Beam or arm 48 mounted on the trunnion block extends into link 32 for engagement with drive mechanism 36 and a second beam or arm 50 extends into link 30 for engagement with drive mechanism 34. The various components of drive mechanism 34 are mounted in an internal housing 52 disposed within one end of outer casing 46. An electric motor 54 supported by plate 56 has a drive gear 58 that meshes with driven gear 60 of a gear reduction drive mechanism 62. Power is transmitted through gear 64 to gear 66 which in turn rotates a ball screw 68. A block member 70 having a threaded hole formed therein is threaded onto ball screw 68 whereby rotation of the ball screw will tend to cause movement of block member 70. However, journals 72 formed on member 70 fit into recesses 74 formed in beam 50. Thus, block 70 is immobile so far as linear movement is concerned and the resulting movement is that of ball screw 68. This movement is transmitted to and accompanied by rotational movement of all of link 30 about the X axis.

The amount or degree of movement permitted for link 30 is controlled by a limit switch 76 actuated as a result of relative movement of link 30. The limit switch does not move with link 30. The particular mounting for the limit switch is not shown since this will vary in accordance with the amount of movement to be permitted for each link. With the limit switch positioned as shown and the spacing 78 between outer casings 44 and 46, movement of hinge 30 is restricted to approximately 20 degrees. However, the hinge connection could be readily modified to permit greater movement. Power is supplied to the hinge via electrical leads 80 and actuation to the limit switch cuts the power to the appropriate electric motor. An electrical schematic illustrating the connections between the plurality of links making up the Serpentuator has not been shown because while very detailed, designing of an electrical system for the Serpentuator is readily accomplished and the exact wiring details would vary considerably with design variations in the Serpentuator.

A multi-link device such as the Serpentuator requires a feedback and control system for controlling the angular rate and movement of the links. Such a control system is within the state of the art, but it would be somewhat complex, particularly if a considerable number of links were used.

However, the need for such a complex control system can be avoided by an alternative version of the Serpentuator which employs a sequencing movement of the links so that only one link moves at a time and furthermore that the motion is restricted to a single plane. The hinge connection shown in FIG. 2 permits movement in two planes, but by proper sequencing, and positioning of limit switches, motion can be simplified to movement in a single plane. One of the drive mechanisms, mechanism 36 for example, can be omitted. By restricting the freedom of movement between links to a single plane and by providing a gimble or universal joint at the point where the Serpentuator is attached to the space station, the free end of the Serpentuator can be positioned at any desired point. Sufficient flexibility in the steering of the Serpentuator is provided by starting the link motion from either the base end or free end of the Serpentuator and permitting the movement to progress along the Serpentuator, one link at a time, with the motion of each link being initiated and terminated by a limit switch, until desired positioning is obtained.

Referring again to FIG. 1 which illustrates the base end of the Serpentuator connected to the space station by a pivotal or gimbaled connection 82. The connection between the Serpentuator and the space station can be either a simple pivot mounting, which is all that is necessary if joints having motion in two planes are employed, or it can, in the alternative be a gimbal or universal joint such as that shown in FIG. 3 of the drawing.

Figure 3:
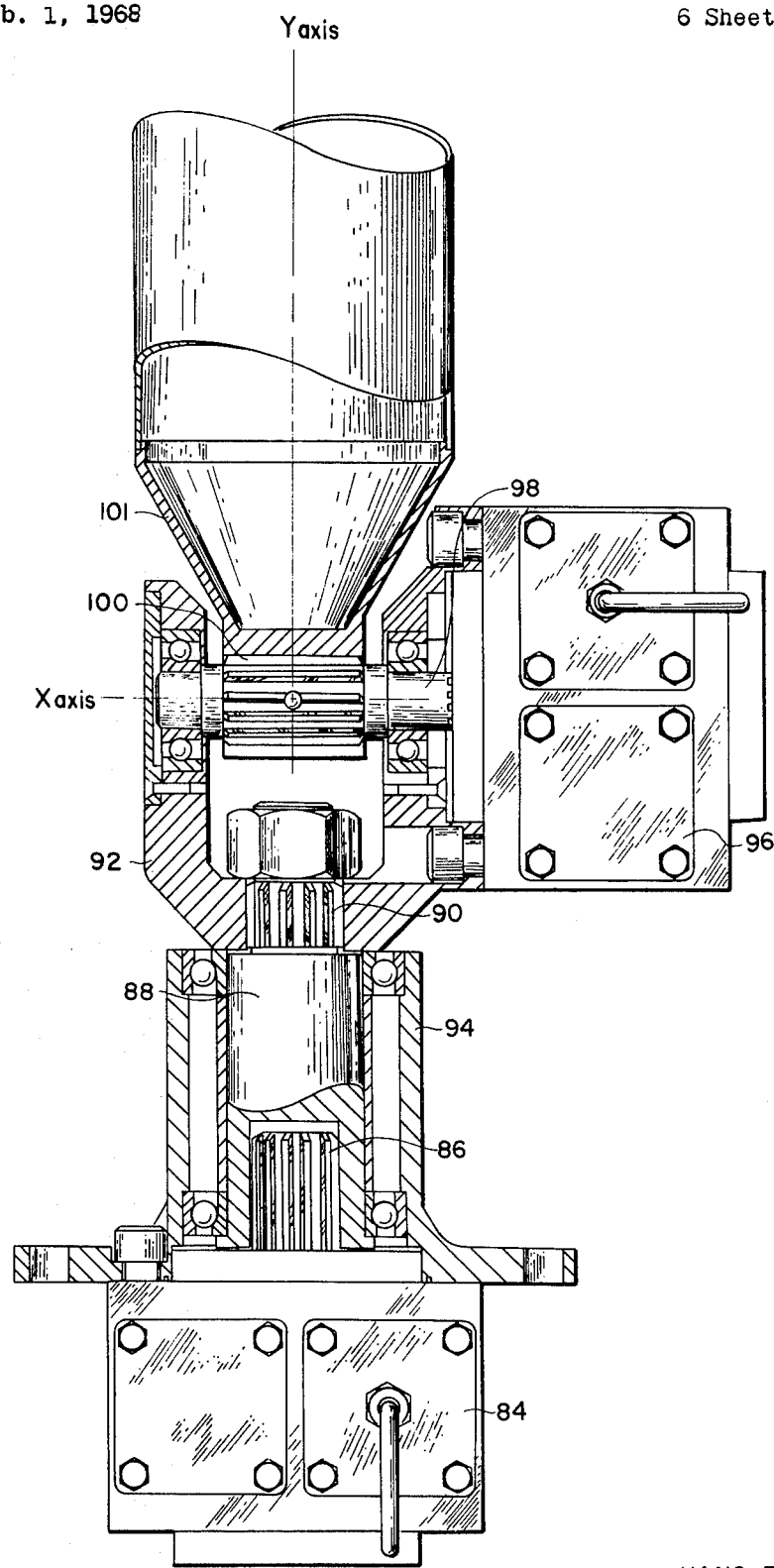
FIG. 3 is a partially cross-sectioned view of a joint connecting the external Serpentuator to the space station.

The gimbal shown in FIG. 3 consists of a first motor mechanism 84 which can either be a hydraulic actuator or an electric motor which rotates the Serpentuator about the longitudinal axis designated by Y. Motor 84 turns splined shaft 86 which in turn rotates shaft 88 having a splined portion 90 which mates with a splined opening in cradle. 92. Shaft 88 is journaled in a collar or housing 94 which is mounted to the space station in a suitable manner. A second motor or actuator 96, which can again be either hydraulic actuated or electrically operated, is mounted to cradle 92 and functions to rotate the Serpentuator about the axis designated by X. Output shaft 98 of the motor is splined and it mates with a splined bore 100 formed on base portion 101 of the Serpentuator. Shaft 98 is journaled in cradle 92. It can be readily appreciated that rotation of the Serpentuator about axes X or Y coupled with the movement made possible by the hinged connection between links makes it possible to position the free end of the Serpentuator at any desired point about the space station.

FIG. 4 shows a nonpowered hinge joint that can be positioned at the midpoint of a link so that each link can be folded to permit storage of the Serpentuator in a smaller volume. By utilizing such a midpoint hinge it is possible to arrange the Serpentuator in a smaller circle for storage in rocket launch vehicles of various diameters. The auxiliary hinge shown in FIG. 4 is a relatively simple mechanism which would only be used during the initial storage and launch of a vehicle carrying the Serpentuator. At first deployment the auxiliary hinges would be opened and locked in a straight position and stay rigid during the operation of the device. As a practical matter, if the hinge connection is a metal to metal union with no special lubricants applied then cold welding which occurs in a zero gravity environment, will take place and the joint will become rigid.

The hinge connection consists of a flared female portion 101 having a tapering surface 102 formed in link section 104. Link section 104 has a transverse bulkhead 106 formed therein and a slotted guide member 108 extends axially from bulkhead 106. Link section 110 has a transverse pin or shaft 112 formed therein which rides in a slot 114 of guide 108. A spring means 113 is connected between link section 104 and section 110 so as to urge tapered surface 115 of link section 110 into engagement with tapered surface 102.

An alternate embodiment of a combined hinge is shown in FIG. 6. This hinge can be disconnected to facilitate storage and then reconnected for powered movement in a single plane. Links 116 and 118 are connected by means of pivotal connection 120. Link section 118 is provided with a spring catch 122 which fits over a stem 124 pivotally mounted to a piston rod 125. Piston rod 125 is connected to a piston 126 slidably mounted within a bore or cylinder 128 formed in link section 116. A supply of fluid pressure is connected to cylinder 128 via pressure line 130. The spring catch 122 can be disconnected and the link section 118 folded back against link section 116. Upon deployment link section 118 can be swung up so that the spring catch engages plunger 124 pivotally connected to piston 126 by pin 127. In this condition, the removal or addition of fluid pressure to cylinder 128 will move piston 126, thus rotating link section 118. The hydraulic actuator mechanism shown could be replaced by an electro mechanical actuator. This type of powered hinge offers some advantages, simplicity for example, over employing a hinge arrangement such as that shown in FIG. 2 in conjunction with a nonpowered midpoint hinge.

Referring now to FIGS. 7 and 8 of the drawing wherein a powered hinge connection between adjacent links 131 and 132 of an internal Serpentuator is illustrated. While only one hinge connection will be described, it should again be understood that each joint in the internal Serpentuator has a powered hinge connection. In a stored or rest position, the links of the internal Serpentuator are folded one upon the other much in the manner of a carpenter's folding rule. The construction of the hinge connection is such that link 132 can be rotated substantially 180 degrees so as to be in longitudinal alignment with link 131. This rotation is accomplished by means of a drive motor 134 which is connected through gear train 136 to a beveled worm gear 138 that meshes with a gear 140 to rotate shaft 142. Gear 140 is keyed to shaft 142 and journaled for rotation in housing 144. Housing 144 is mounted in link section 104 and extends outwardly from one end thereof. It will be noted that housing 144 is somewhat elongated and also encloses gear drive 136 and acts as a support for drive motor 134. Shaft 142 has splined end portions 146 which fit into splined openings 148 in link 132 so that rotation of shaft 142 results in rotation of link 132 about the longitudinal axis of shaft 142. The operation of the hinge joint is apparent even through every member of the gear drive mechanism 136 has not been discussed. Power from motor 134 is transmitted through the gear train to the pinion gear 140 which results in rotation of link 132 about the longitudinal axis of shaft 142. Operation of the Serpentuator will again be sequential with movement starting from either end. Limit switches such as those designated by numerals 150 and 152 are provided to inactivate drive motor 134 when the link sections have been moved to the folded position shown in FIG. 6. Limit switches (not shown) must also be provided so as to inactivate the drive motor when link section 132 has been rotated around to a position where its longitudinal axis is in alignment with that of link section 130.

Figure 9:
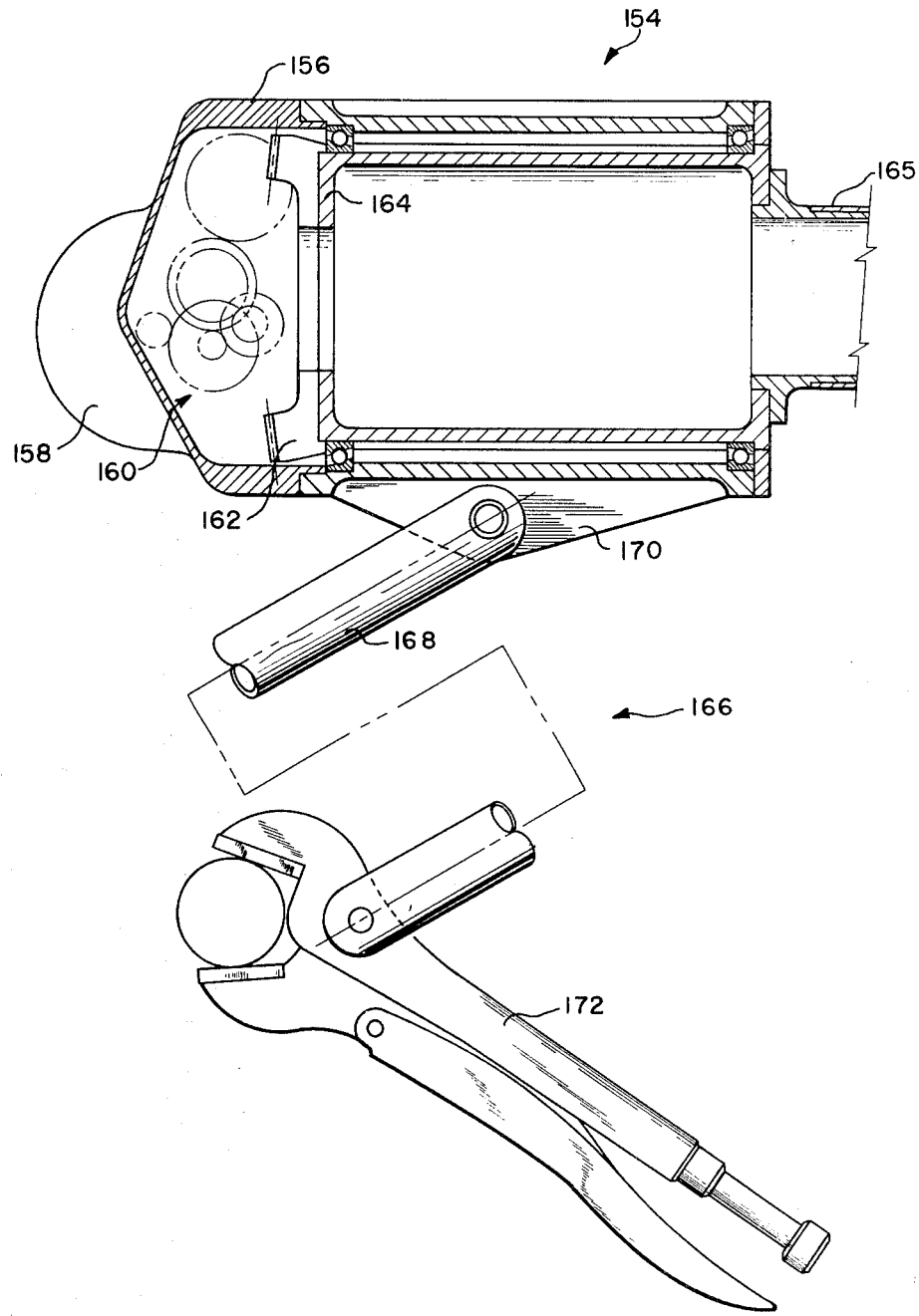
FIG. 9 is a view in cross-section of the base end of the internal Serpentuator.

Referring now to FIG. 9 of the drawing wherein base portion 154 of the internal Serpentuator is shown. By base portion it is meant that portion of the Serpentuator which is normally clamped or otherwise fastened to some structural portion of the space station. The base section includes a rotatable joint which permits rotation of the Serpentuator about its longitudinal axis. This rotation coupled with the single plane movement permitted by the powered hinged connection between adjacent links permits sufficient flexibility of movement to allow the free end or tip end of the Serpentuator to be positioned as desired. The base portion consists of an outer housing 156 which has an electric motor 158 mounted thereto. The output of the electric motor is connected into a gear reduction mechanism 160 mounted in housing 156 which drives a ring gear 162 attached to one end of an internal casing 164. Housing 164 is journaled for rotation within housing 156. The last or end link section 165 of the Serpentuator is mounted to one end of the internal housing 164 so as to be rotatable therewith.

External housing 156 has a plurality of clamping devices 166 attached thereto (only one of which is shown herein). This external clamping device consists of a lever or arm member 168 pivotally mounted to a bracket 170 formed on housing 156. The other end of arm member 168 has a clamping means such as a vice grip type plier 172 pivotally mounted thereto. It should be understood that the lever arm could be a single member or it could be a plurality of members pivotally connected together. Also the clamping means shown herein as a pliers could be replaced with some other suitable attachment means.

This completes the detailed description of the invention. While a preferred embodiment has been described herein, there will be many changes and modifications thereto which can be made by one skilled in the art to which the invention pertains.

What is claimed is:

1. A system for performing handling and locating operations within the vicinity of a space station comprising, in combination:
   a first device that includes a plurality of cylindrical links connected at their ends so as to form a chain having a base and a tip end;
   said first device having the base end thereof mounted to the exterior surface of the space station and the tip end unattached;
   said first device including first actuator means for controlling the angular relationships and positioning of the cylindrical links with respect to each other; whereby the tip end of the first device can be positioned around the space station;
   a second device that includes a plurality of cylindrical links connected at their ends to form a chain having a base and a tip end;
   said second device further including a second actuator means for controlling the relative angular relationship and position of the cylindrical links, and;
   clamping means mounted on the base end of said second device for attaching the second device to various parts of the space station and to the tip end of the first device whereby, said second device can be used alone within the space station and outside of the space station in conjunction with the first device so as to increase the effective operating range thereof.

2. A system as recited in claim 1 wherein:
said cylindrical links of the first device are connected by a joint means that permits motion of connected links in two planes that are normal to one another.

3. A system as recited in claim 1 wherein:
said cylindrical links of the first device are connected by a joint means that restricts the motion of connected links to a single plane.

4. A system as recited in claim 3 wherein:
said first actuator means includes a powered joint means connecting the base end of said first device to the space station to produce rotational movement of the first device about its longitudinal axis and also pivotal movement in a single plane.

5. The system recited in claim 4 wherein adjacent links of said second device are connected by joint means that allows pivotal movement of such link through approximately 180 degrees.

6. The system recited in claim 5 wherein the second actuator means of said second device includes:
   an electric motor in each link that is connected through a gear mechanism to an adjacent one of the joint means between links of the second device.

7. The system recited in claim 6 wherein the second actuator means of said second device further includes:
   a cylindrical outer housing having a drive motor mounted thereon;
   a cylindrical inner housing rotatably mounted in said outer housing, said inner housing having a gear mounted on one end and the other end connected to an end link of said second device, and;
   gear reduction means connected between the drive motor mounted on the outer housing and the gear on said inner housing to cause rotation of the second device about its longitudinal axis.

8. The system recited in claim 7 wherein the clamping means mounted on the base end of said second device includes:
   a plurality of arm members attached at one end thereof to said outer housing;
   a gripping means attached to the other end of each arm member for attaching the base end of the second device to an object.

9. The system recited in claim 8 which further includes:
   an unpowered hinge joint at the midpoint of each of the cylindrical links in said first device that can be employed to facilitate storage of the first device.

References Cited

UNITED STATES PATENTS

| | | | |
|---|---|---|---|
| 3,268,091 | 8/1966 | Melton | 214—1 |
| 3,401,903 | 9/1968 | Bohr | 244—1 |
| 3,422,965 | 1/1969 | Lloyd | 214—1 |

FERGUS S. MIDDLETON, Primary Examiner

U.S. Cl. X.R.

214—1